United States Patent

Gérard et al.

[11] Patent Number: 6,122,507
[45] Date of Patent: *Sep. 19, 2000

[54] CALL HANDOVER IN A NON-GEOSTATIONARY SATELLITE CONSTELLATION

[75] Inventors: Maral Gérard, Goyrans; Restrepo Joaquim, Toulouse, both of France

[73] Assignee: France Telecom, Paris, France

[*] Notice: This patent is subject to a terminal disclaimer.

[21] Appl. No.: 09/027,928

[22] Filed: Feb. 23, 1998

[30] Foreign Application Priority Data

Feb. 26, 1997 [FR] France .................................. 97-02392

[51] Int. Cl.$^7$ ....................................................... H04Q 7/36

[52] U.S. Cl. .......................... 455/428; 455/436; 455/12.1; 455/429; 455/427

[58] Field of Search ................................ 455/12.1, 13.1, 455/13.2, 438, 429, 428, 427

[56] References Cited

U.S. PATENT DOCUMENTS

| | | | |
|---|---|---|---|
| 4,718,081 | 1/1988 | Brenig | 379/438 |
| 5,678,184 | 10/1997 | Cutler, Jr. et al. | 455/13.1 |
| 5,777,577 | 7/1998 | Kumar | 342/352 |
| 5,867,765 | 2/1999 | Nilsson | 455/13.1 |
| 5,884,164 | 3/1999 | Gérard et al. | 455/428 |

OTHER PUBLICATIONS

"Mobile and Personal Satellite Communication 2" Proceedings of the Second European Workshop on Mobile/Personal Satcoms (EMPS '96), F. Vatalaro and F. Anassaso (eds.) Abstract, "Providing Appropriate Service Quality to Fixed and Mobile Users in Non–Geo Satellite–Fixed Cell System" Joaquin Restrepo et al. pp. 79–96.

Proceedings of the fourth International Mobile Satellite Conference 1995, Ottawa, Canada, Jun. 6–8, 1995, "A UT Positioning Approach for Dynamic Satellite Constellations" W.Zhao et al.pp. 35–40.

*Primary Examiner*—Lee Nguyen
*Assistant Examiner*—Isaak R. Jama
*Attorney, Agent, or Firm*—Lowe Hauptman Gopstein Gilman & Berner

[57] ABSTRACT

Following a call set-up request emitted by a terminal of a given user of a telecommunications system using a constellation of non-geostationary satellites, the terminal reserves a channel in the cell in which it is located and in neighboring cells not including all the cells it will have to cross during a predetermined time period. For each cell where a channel has not been reserved, the given user's terminal waits until it is at a predetermined distance from its point of handover into the cell, equal to the greatest distance a user can travel in the cell, before transmitting a reservation request. The call set-up request is accepted only if a condition relating to the number of other users near the given user at the time of the call set-up request is satisfied.

8 Claims, 10 Drawing Sheets

CALL HANDOVER IN A NON-GEOSTATIONARY SATELLITE CONSTELLATION

BACKGROUND OF THE INVENTION

1. Field of the Invention

The present invention is generally concerned with non-geostationary satellite constellations in telecommunications systems with satellite-fixed cells.

2. Description of the Prior Art

Several non-geostationary satellite constellation projects propose to offer circuit-mode telecommunication services such as telephony, facsimile and transmission of data to mobile users. These project include the IRIDIUM (registered trademark) project of the American company MOTOROLA, the GLOBALSTAR (registered trademark) project of the American company LORAL SPACE SYSTEMS, the ICO project proposed by INMARSAT and the ODYSSEY (registered trademark) project of the American company TRW.

The satellites in these constellations are equipped with multibeam antennas. Each beam defines a contour on the surface of the Earth delimiting a coverage area called a "cell". With no specific device for varying with time the pointing of the antennas, the beams and therefore the associated cells remain in a fixed position relative to the body of the satellite. This concept is therefore known as the satellite-fixed cell system. Because of the movement of the satellites, the cells move over the surface of the Earth and calls in progress have to change cell if the duration of the call exceeds the time for the cell to pass over the user. This change of cell is known as handover from beam to beam for a call, i.e. "beam handover". It may be necessary for the calls to be transferred from one satellite to the next, which is known as "satellite handover".

The cell or the satellite taking over the call in progress may not have any free channel at the time of such handover and the call is then interrupted, which is known as "forced call termination". Mobile phone users currently served by terrestrial cellular networks encounter the same problem, but here because of the mobility of the users. For fixed users of terrestrial cellular networks who remain in the same cell throughout the duration of their call, there is no handover of the call from one cell to another, and therefore no interruption of the call. Given that the non-geostationary satellite constellations are intended to constitute an extension of the terrestrial cellular service, it would be desirable to be able to offer a service quality equivalent to that of terrestrial cellular networks. Furthermore, these constellations could provide communication services to fixed users. To offer fixed users a service quality equivalent to that of terrestrial systems or of geostationary satellite systems, interruption of calls due to cell-to-cell handovers resulting from the movement of the satellites must be avoided.

The non-geostationary satellite constellations envisaged at this time are intended to offer communication services to mobile users and could offer services to fixed users but without guaranteeing mobile or fixed users successful beam handovers or successful satellite handovers. This means that the service quality offered to fixed users in such constellations would be worse than that provided by other telecommunication systems such as with microwave beams, optic fibers, geostationary satellites, etc. This drawback means that such constellations are not a very beneficial alternative for fixed users.

One method of guaranteeing call continuity to users on beam handovers or satellite handovers in non-geostationary satellite constellation systems is to reserve a channel in each of the cells that the user will pass through during the call when a user submits a call set-up request. Apart from the fact that it is difficult to predict the exact duration of a call, and therefore the number of cells concerned, this method leads to unnecessary over-rating of the capacity of the satellite.

In another method, disclosed in the article by the inventors entitled "Providing appropriate service quality to fixed and mobile users in a non-geo satellite-fixed cell system" published in "Proceedings of the Second European Workshop on Mobile/Personal Satcoms" EMPS'96, Part 2, pages 79–96, immediately after a call set-up request a user reserves a channel in the cell in which he is located and in the next cell that he will have to cross. Thereafter, each time user enters a cell, he requests reservation of a channel in the next cell. This method guarantees the transfer of user's calls from one cell to the other, but only in the particular case in which all the cells are identical, rectangular in shape, contiguous and aligned relative to the direction of movement of the satellites.

OBJECTS OF THE INVENTION

The main object of this invention is to remedy the aforementioned drawbacks.

Another object of this invention is to guarantee successful user call handovers in a non-geostationary satellite constellation for respective periods predefined by the users, reserving the strictly necessary number of channels, for the minimal time, in the cells that the users cross, irrespective of the form and arrangement of the cells.

SUMMARY OF THE INVENTION

Accordingly, there is provided a method of handing over calls of predetermined users in a cellular telecommunications system using a constellation of non-geostationary satellites and satellite-fixed cells with which call channels are respectively associated, having predetermined respective contours and moving relative to the surface of the Earth in a predetermined direction, the speed of predetermined users relative to the surface of the Earth being negligible in comparison to the speed of travel of the cells, the predetermined users having locations known at the time of each call set-up request emitted by predetermined user's terminals.

The method includes, for a given user among said predetermined users, after a call set-up request emitted by the terminal of the given user and for each cell of a predetermined group of adjacent cells to which said given user may be successively allocated, the given user being in a first cell of the predetermined group at the time of the call set-up request:

first seeps wherein, if a first distance between the given user and a predetermined handover point into said each cell at the time of the call set-up request, the first distance being zero if said each cell is the first cell of the predetermined group, is greater than a predetermined distance equal to a maximal length of said each cell parallel to said predetermined direction, a reservation of a call channel associated with said each cell is requested for/by the terminal if the given user's terminal is substantially at said predetermined distance from said predetermined handover point, second steps in which, if said first distance is less than said predetermined distance, (a) if there is a free communication channel associated with said each cell, this channel is reserved for/by the given user's terminal, (b)

if said each cell is not the first cell and if no channel associated with said each cell is free but if among the latter there is an unreserved channel occupied by the terminal of any user of the telecommunications system situated at a distance from the contour of said each cell in a direction opposite to the predetermined direction less than the first distance, then the occupied unreserved channel is reserved for/by the given user's terminal, (c) otherwise, said call set-up request is refused, and third steps in which said call set-up request is refused if a number of predetermined users communicating and included in one of areas obtained by translation of said each cell in said predetermined direction by a distance between said first distance and a second distance is at least equal to a communication channel capacity of said each cell, said second distance at the time of the call set-up request between the given user and a predetermined transfer point of the given user into an allocation cell succeeding said each cell.

Following the call set-up request, the given user being firstly in the first cell of the predetermined group, a call channel is immediately reserved in this cell and possibly in adjacent cells of the predetermined group near the first cell, if at least one call channel is available in each of these cells. A call channel reservation request is then effected in each of the other cells of the predetermined group, which are at a greater distance from the first cell, only if the user is at the corresponding predetermined distance from the handover point in that cell. The method of the invention minimizes the time for which the call channels are reserved.

Moreover, if there is no call set-up refusal for the given user, handovers of a call consequent upon the previously mentioned call set-up request are guaranteed.

The method of the invention applies to mobile users when their speed is sufficiently low relative to the speed at which the cells move across the surface of the Earth. This condition is satisfied for the intended non-geostationary satellite constellations. The speed at which the cells move relative to the surface of the Earth is 7 km/s for constellations in low Earth orbit, i.e. at 500 to 2,000 km altitude, and from 1 to 2 km/s for constellations in intermediate orbit, at 10,000 to 20,000 km altitude. The method therefore covers most mobiles including pedestrians, terrestrial and maritime mobiles and subsonic aircrafts.

Preferably, the number of predetermined users communicating concerns only predetermined users whose respective predetermined groups of adjacent cells include said each cell. In this case, said number of users communicating is always less than or equal to the capacity of said each cell in terms of call channels. The predetermined users referred to here are users who may subsequently be allocated to said each cell and who have not yet made any channel reservation request in that cell, or users not yet allocated in that cell but having submitted a channel reservation request in the latter, or users already using a channel of said each cell.

According to a variant of the method, if, at the time of the call set-up request transmitted by the given user's terminal, the first distance between the given user and the predetermined handover point into said each cell is greater than the predetermined distance, the reservation of a call channel is requested only if a number of predetermined communicating users which are included in an area obtained by translating said each cell in the predetermined direction by the first distance and of which the respective predetermined groups of adjacent cells include said each cell, is less than the capacity in terms of call channels of said each cell.

The predetermined group of adjacent cells can be constructed on the one hand so that the given user is not handed over into said each cell if said each cell is a cell other than the first cell of the predetermined group until after having remained allocated for as long as possible to a preceding cell, and on the other hand so that if, on leaving a cell of the predetermined group, the given user is simultaneously included in plural cells of the telecommunications system, the cell from said plural cells to which the given user is allocated is that which the travel time of said given user is the longest. This minimizes the number of handovers to be effected for the given user during a call consequent upon his call set-up request.

The number of cells in the predetermined group of cells typically depend on a duration previously defined, for example by the given user, during which the process is applied for that given user after each call set-up request transmitted by the terminal of the given user.

According to a second embodiment of the invention, the method further includes a step for eliminating beforehand in each of the cells of the telecommunications system at least one area of overlap with another cell of said telecommunications system.

According to a third embodiment of the invention, the cells are identical, rectangular in shape and aligned relative to the predetermined direction, and the second steps are eliminated.

BRIEF DESCRIPTION OF THE DRAWINGS

The foregoing and other objects, features and advantages of the present invention will apparent more clearly from the reading of the following description of several preferred embodiments of the invention with reference to the corresponding accompanying drawings in which.

DESCRIPTION OF THE PREFERRED EMBODIMENTS

Figure 1:
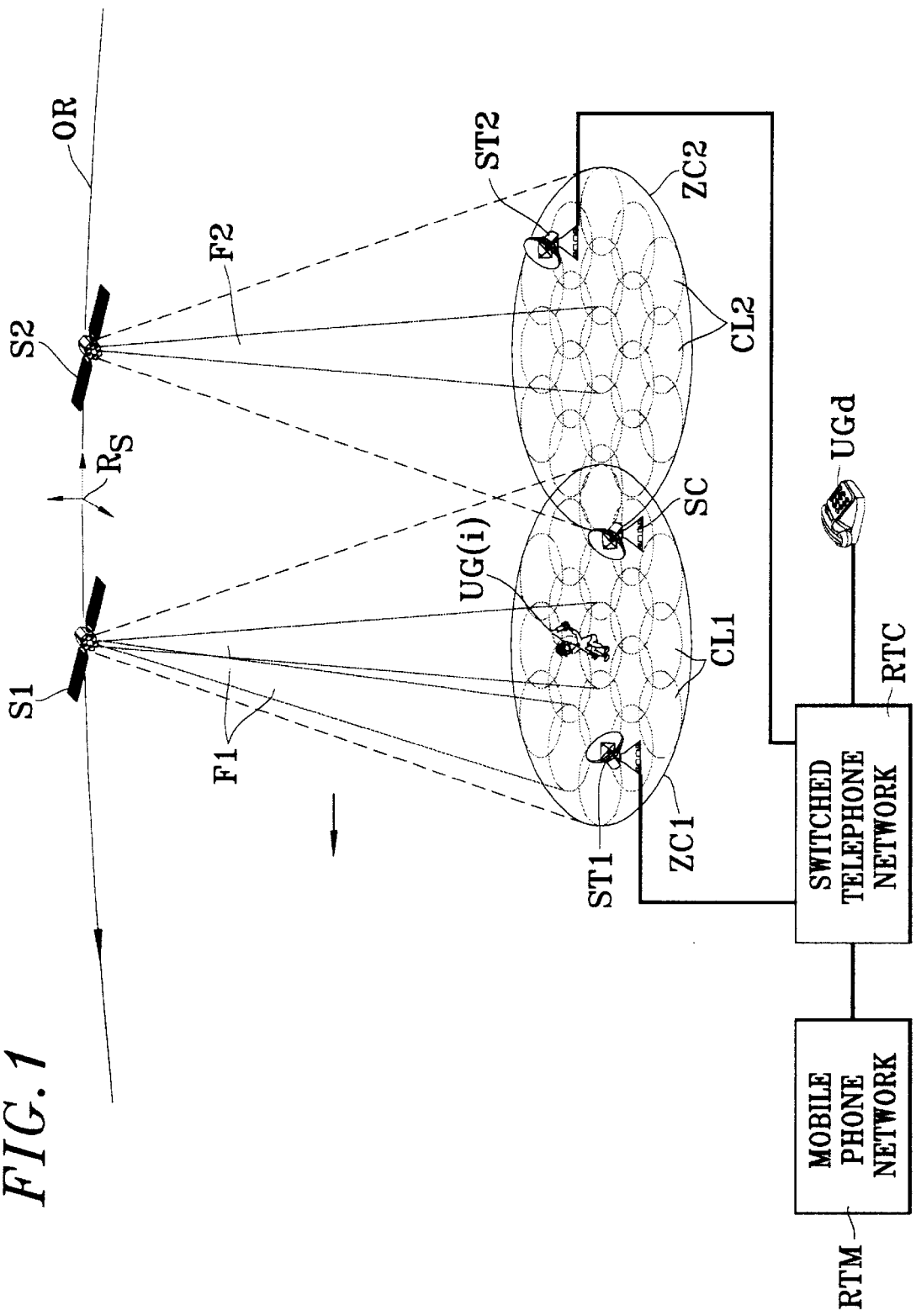
FIG. 1 shows two satellites of a constellation of non-geostationary satellites located in the same orbit and cells fixed to these satellites.

Referring to FIG. 1, satellites S1 and S2 travel around the Earth in the same low or intermediate orbit OR at a known constant speed $V_S$ relative to the surface of the Earth. The satellites S1 and S2 are part of a constellation of non-geostationary satellites typically comprising several orbits and several satellites per orbit. In the IRIDIUM (registered trademark) project of the American company MOTOROLA, for example, the constellation of non-geostationary satellites comprises 66 satellites in six orbital planes at an altitude of 787 km.

Several antenna beams F1, F2 from each satellite S1, S2 respectively define contours on the surface of the Earth delimiting coverage areas called cells CL1, CL2. The cells CL1, CL2 are fixed to the satellite S1, S2 and therefore travel across the surface of the Earth. The contours of the cells CL1, CL2 correspond to constant values of a radio parameter, for example the gain, associated with the antennas of the satellite S1, S2. The satellite S1, S2 covers a total coverage area ZC1, ZC2 consisting of the combination of the cells CL1, CL2.

Ground stations ST1 and ST2 fixed relative to the Earth transmit and receive call signals in order to exchange information between terrestrial networks, such as the switched telephone network RTC or a terrestrial mobile phone network RTM, and the satellites S1 and S2 of the constellation of non-geostationary satellites. Thus, if a given fixed or mobile user UG(i) in the total coverage area ZC1 of the satellite S1, to be more precise in a cell CL1, having a radio phone terminal capable of emitting and receiving radio signals wishes to set up a call, for example to a user UGd of the switched telephone network RTC, a call set-up request is emitted from the terminal of the fixed or mobile user UG(i) via an uplink signaling channel of a beam F1 to the satellite S1 and is then re-emitted to a ground station ST1 connected to the switched telephone network RTC in order to be transmitted to the terminal of the called fixed user UGd. During a call between the terminals of users UG(i) and UGd, consequent upon the previously mentioned call set-up request, cells CL1, CL2 moving over the surface of the Earth pass successively over the user UG(i) if the duration of the call exceeds the time for the user UG(i) to cross a cell. The method of the invention hands over the call in progress from one cell to the next without interrupting the call.

In the remainder of the description, all movements are considered in a frame of reference $R_S$ fixed relative to the satellites. In the frame of reference $R_S$, the satellites are fixed and the user UG(i), whose speed relative to the surface of the Earth is negligible, moves along a straight line path T(i), shown in FIG. 3A, in a direction opposite to the direction of movement of the satellites relative to the surface of the Earth. The straight line path T(i) depends on the speeds of the satellites and the speed of rotation of the Earth and on the initial position $X_0(i)$ of the user UG(i) at the time of a call set-up request effected by the latter's terminal. It is assumed that this initial position $X_0(i)$ is known. It is determined by virtue of the terminal of user UG(i) sending signaling messages to the cellular telecommunications system with satellites S1, S2, for example.

For simplicity, only the distances traveled by the user UG(i) in the cells are taken into consideration hereinafter, rather than the time to cross these cells. The time-to-distance conversion is given by the equation:

$$X(i) = V_S t$$

where $X(i)$ is the distance traveled by the user UG(i) in time t and $V_S$ is the aforementioned speed of the satellites relative to the surface of the Earth.

In accordance with the invention, the user UG(i) has previously subscribed to a "guaranteed handover" service ATG described hereinafter. To this end, the user UG(i) has defined a predetermined maximal call duration $\tau(i)$ during which the ATG service applies for each call with another user. The duration $\tau(i)$ called as predetermined maximal guaranteed-handover duration corresponds through the above time-to-distance conversion to a predetermined maximal guaranteed-handover distance $L_\tau(i) = V_S \tau(i)$. If the duration of a call by the user UG(i) exceeds the maximal duration $\tau(i)$, then the user UG(i) no longer benefits from the ATG service for the remainder of the call.

Figure 2A:
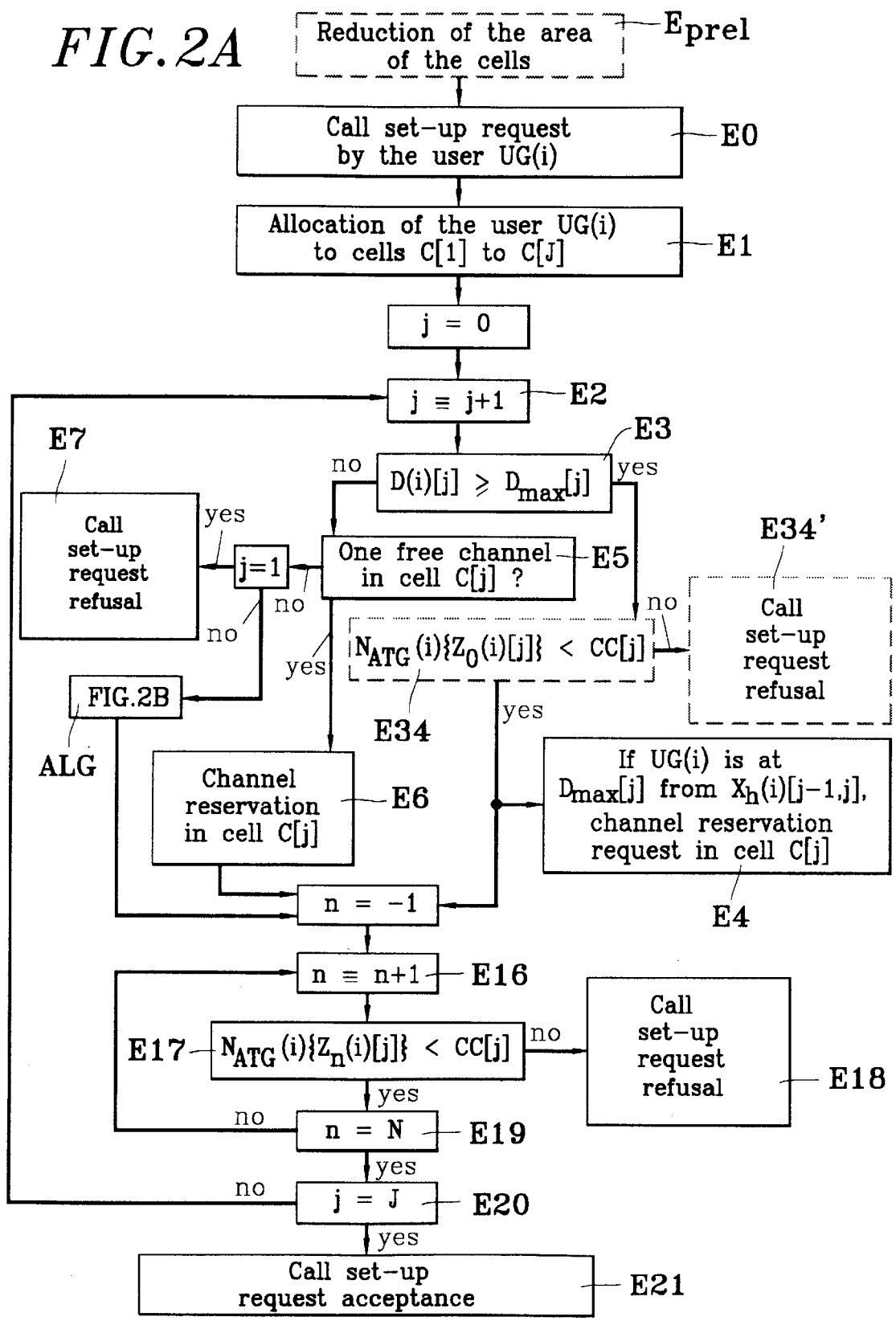
FIG. 2A is a call handover algorithm conforming to first and second embodiments of the present invention.
Figure 2B:
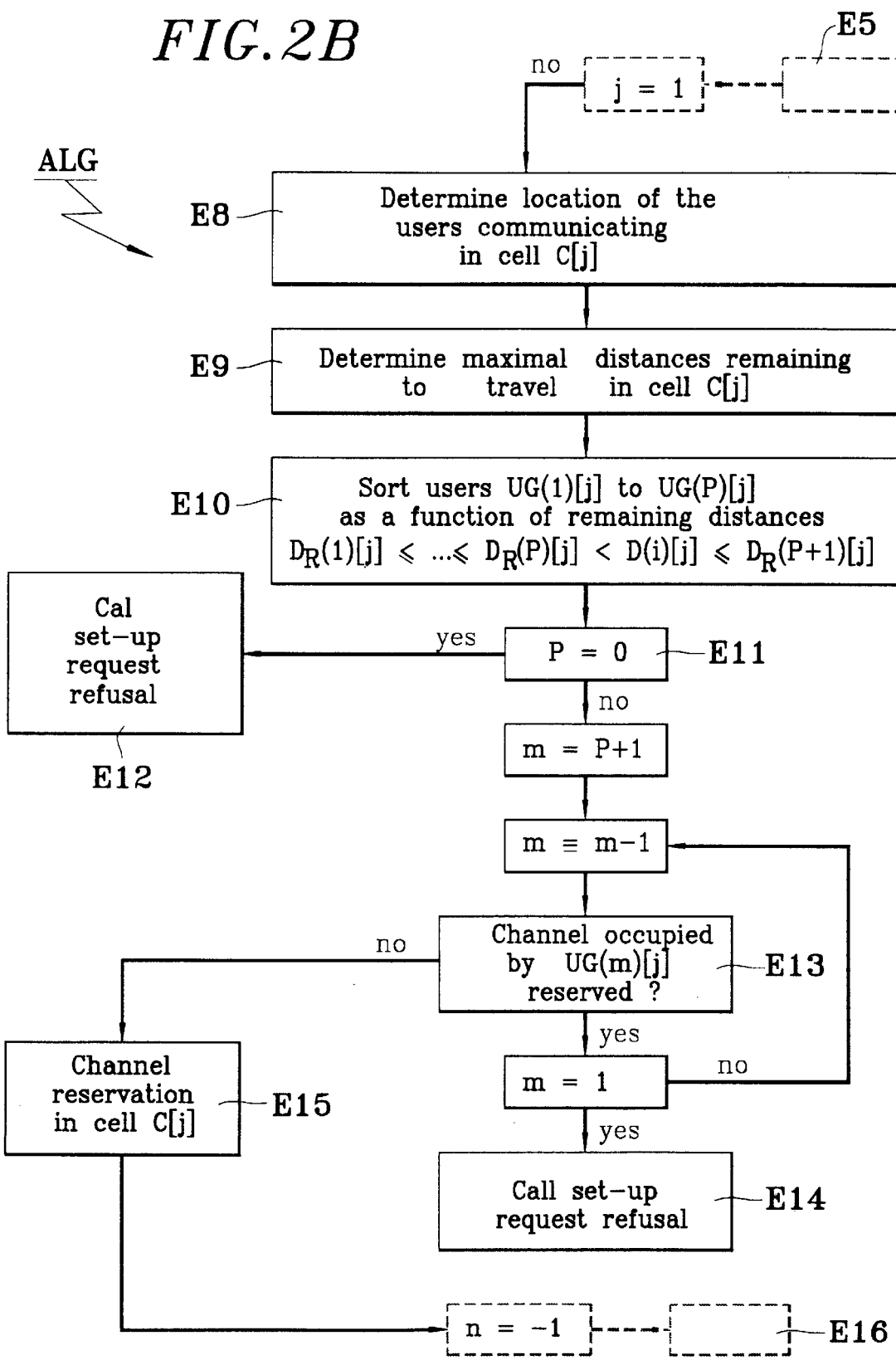
FIG. 2B is a sub-algorithm included in the FIG. 2A algorithm.

FIGS. 2A and 2B show an algorithm of the method of the invention implemented for a user who has subscribed to the ATG service, referred to hereinafter as an "ATG user". The algorithm is implemented partly in a control ground station SC or in a satellite of the constellation and partly in the terminal of the ATG user.

In a first embodiment, the algorithm includes an initial step E1, a channel reservation request step E4 and channel reservation steps E6 and E15, test steps E3, E5, E13 and E17, and final steps in the form of call set-up request acceptance E21 or of call set-up request refusal E7, E12, E14 and E18.

Step E1, which follows on from a call set-up request emitted by the terminal of the user UG(i) in a step E0, consists in predetermining the cells to which the user UG(i) will be allocated during a call consequent upon the aforementioned call set-up request. There are overlap areas between the cells in which users can be allocated to a plurality of different cells at a given point on their path of movement, i.e. in which users can use call channels of more than one cell. The purpose of step E1 is to pre-allocate user UG(i) to a group of cells successively crossed by his path T(i) with the minimal number of user handovers from one cell to another. Step E1 is described in more detail hereinafter with reference to FIG. 3A.

Figure 3A:
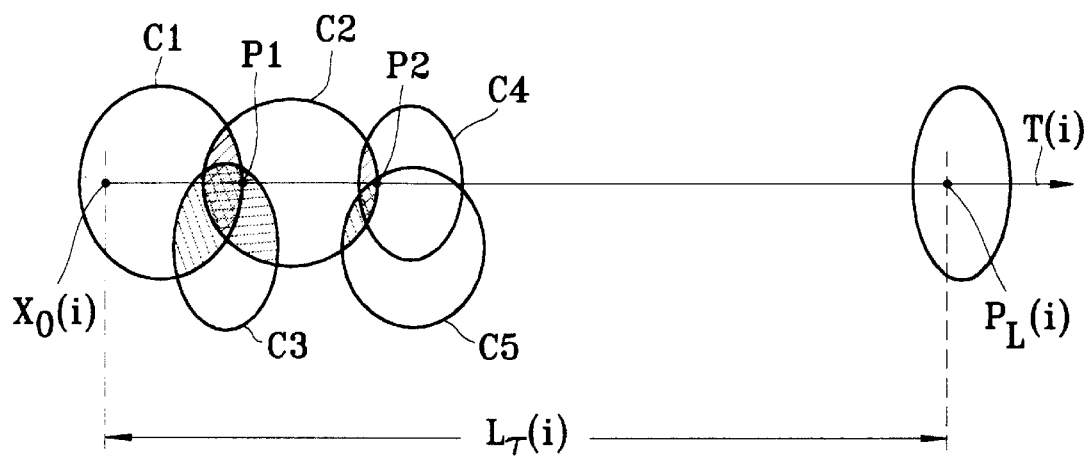
FIGS. 3A and 3B respectively show cells that a user may cross through during a call, and cells to which the user may be allocated during the call.

FIG. 3A shows, by way of example, the contours of adjacent cells C1 through C5 "fixed" to one or more satellites in the same orbit, and the path T(i) of user UG(i) across cells C1 through C5. The cells are typically different shapes and different sizes and there are overlap areas between them shown cross-hatched in FIG. 3A. The allocation of user UG(i) to the cells is based on three criteria CR1, CR2 and CR3.

The first criterion CR1 requires the user, when allocated to a given cell, to remain allocated to the given cell for as long as possible and not to be handed over to a subsequent cell, that is to say to begin to use a channel of the subsequent cell, as soon as the user has reached the boundary of said given cell. Thus, in FIG. 3A, the user UG(i) effecting a call set-up request at a point $X_0(i)$ in cell C1 continues to be allocated to that cell up to a handover point P1 at the intersection of path T(i) and the contour of cell C1.

According to the second criterion CR2, when the user leaving a cell enters an area of overlap between a plurality of cells, they are allocated to the cell in which they can travel the greatest distance, i.e. in which the user travel time is the longest. In the example shown, upon leaving cell C1 user UG(i) enters an area of overlap between cells C2 and C3. The user is then handed over into cell C2, and not into cell C3, and remains allocated to cell C2 up to a handover point P2 of intersection between the path T(i) and the contour of cell C2. This second criterion CR2 is also applied to choosing the first allocation cell if the point $X_0(i)$ is in an overlap area.

According to the third criterion CR3, if user UG(i) can be allocated to a plurality of overlapping cells at a point on path T(i) and the distances that he can travel in these overlapping cells are equal, as shown by cells C4 and C5 at the exit from cell C2 in FIG. 3A, the user is allocated to whichever of said overlapping cells is allocated the greatest capacity in terms of call channels, regardless of whether these channels are busy or free.

This allocation process is continued up to a limit point $P_L(i)$ of path T(i) at distance $L_\tau(i)$ from $X_0(i)$. In practise, however, cells usually overlap only two by two. In this case the second criterion is used only to determine the first allocation cell.

Figure 3B:
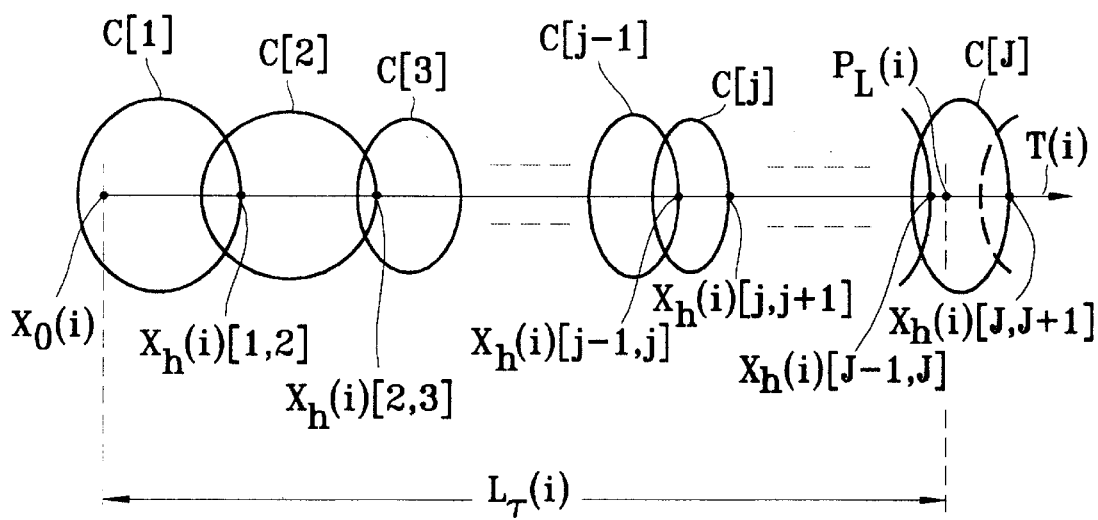

FIG. 3B shows only the cells to which the user is successively allocated along path T(i), respectively referred to as cells C[1] through C[J] in the remainder of the description, the last cell C[J] containing the aforementioned limit point $P_L(i)$. J is an integer dependent on the predetermined distance $L_\tau(i)$ and therefore on the predetermined duration τ(i) and designating the maximum number of cells for which the method of the invention is applied to the user UG(i).

Figure 4:
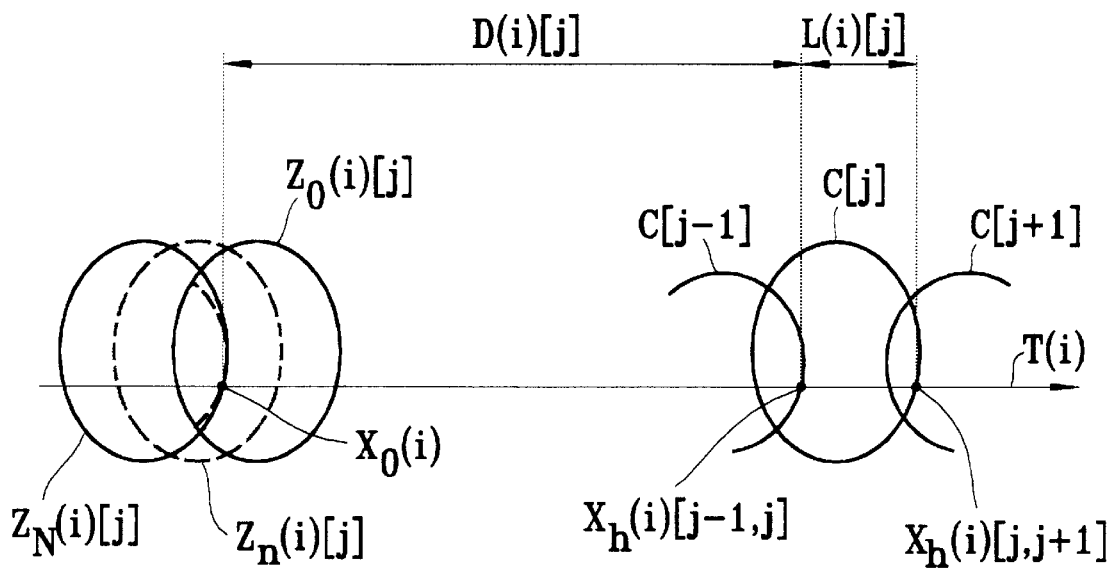
FIG. 4 is a diagram of areas obtained by translation of an allocation cell of the user used in the FIG. 2 algorithm.
Figure 5:
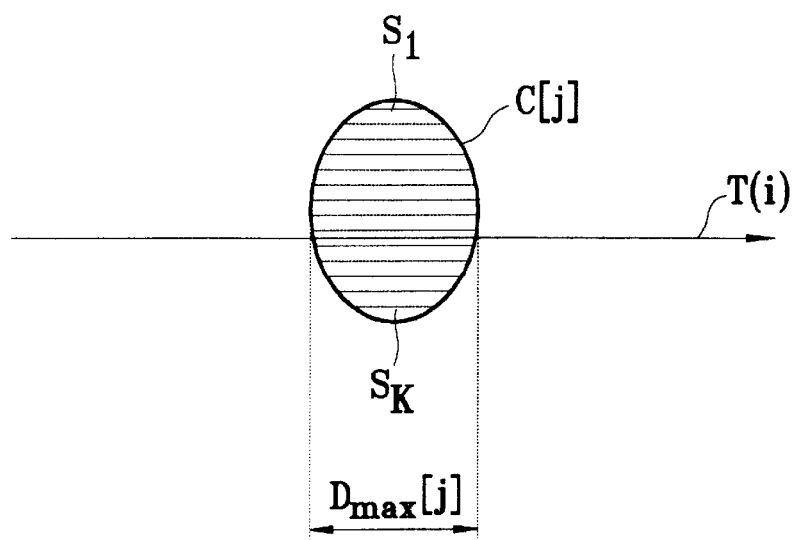
FIG. 5 is a diagram for determining a maximal distance in a cell, used in the FIG. 2 algorithm.

For a better understanding of the algorithm in accordance with the invention, there follow definitions of the following notations, some of which are used in FIGS. 3B, 4 and 5:

$X_h(i)[j-1,j]$: predetermined point of handover of the call of the user UG(i) from cell C[j-1] to cell C[j], also known as the point of handover of the user UG(i) into cell C[j]. This point is determined in step E1.

For the first cell C[1] to which user UG(i) is allocated, the handover point $X_h(i)[0,1]$ is equal to $X_0(i)$.

A handover point $X_h(i)[J,J+1]$ to a cell following on from cell C[J] is also defined in accordance with criteria CR1, as shown in FIG. 3B.

D(i)[j]: distance between the user UG(i) and handover point $X_h(i)[j-1,j]$ into cell C[j] at the time of the call set-up request, as shown in FIG. 4. This distance is equal to $X_h(i)[j-1,j]-X_0(i)$ if the user UG(i) is outside cell C[j] at the time of the call set-up request and is equal to 0 if the latter user is already on the contour of or inside cell C[j] at this same time.

L(i)[j]: length of travel of the user UG(i) in cell C[j] along path T(i), as shown in FIG. 4. This length is equal to $X_h(i)[j,j+1]-X_h(i)[j-1,j]$.

$D_{max}[j]$: maximal distance a user can travel in cell C[j]. This distance, shown in FIG. 5, is equal to the maximal length of cell C[j] parallel to path T(i) and is predetermined by calculating the maximal length of K segments $S_1$ through $S_K$ parallel to path T(i) included in cell C[j] and delimited by the contour of cell C[j].

$Z_0(i)[j]$: area, shown in FIG. 4, obtained by translating cell C[j] in a direction opposite that of path T(i), i.e. in the direction of movement of the satellites relative to the Earth, by distance D(i)[j]. This area with its contour includes the point $X_0(i)$.

$Z_n(i)[j]$: area, shown in FIG. 4, obtained by translating cell C[j] in a direction opposite that of path T(i) by a distance D(i)[j]+(n/N×L(i)[j]), where n and N are integers such that n≦N. This area contains the point $X_0(i)$.

$Z_N(i)[j]$: area, shown in FIG. 4, obtained by translating cell C[j] in a direction opposite that of path T(i) by a distance D(i)[j]+L(i)[j]=D(i)[j+1]. The user UG(i) at point $X_0(i)$ is at the exit from this area, on its contour, at the time of the call set-up request.

$N_{ATG}(i)\{Z_n(i)[j]\}$: number of ATG users present and communicating in area $Z_n(i)[j]$, where n=0 through N, and entitled to the ATG service for their handover into cell C[j] at the time of the call set-up request by the user UG(i).

CC[j]: capacity in terms of call channels of cell C[j], i.e. the number of channels allocated to that cell, if this capacity is constant. If this capacity varies with time, for example if the constellation is a dynamic channel allocation system, CC[j] designates the maximal capacity that can be allocated to cell C[j]. The number $N_{ATG}(i)\{Z_n(i)[j]\}$ is always less than or equal to CC[j].

W[j]: buffer memory receiving channel reservation requests from ATG users for cell C[j].

Figure 6A:
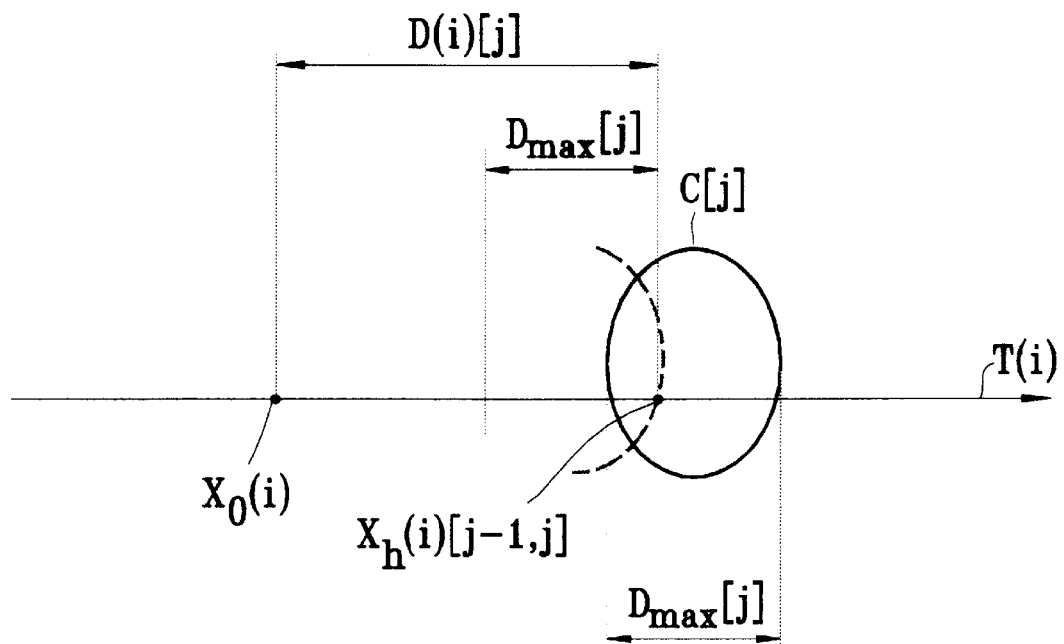
FIGS. 6A and 6B are respectively diagrams showing two configurations of position of the user relative to an allocation cell.

Referring again to FIG. 2A, for each cell C[j] determined by j=1 to J (step E2), that the user UG(i) is likely to cross during a call, the distance D(i)[j] between the user UG(i) and his handover point $X_h(i)[j-1,j]$ into cell C[j] at the time of the call set-up request is compared to $D_{max}[j]$ in test step E3. If user UG(i) is at this time at a distance from his handover point into cell C[j] greater than or equal to $D_{max}[j]$, as shown in FIG. 6A, then the algorithm advances to step E4 and to step E16 simultaneously. In step E4, if the user is not at the distance $D_{max}[j]$ from their point of handover $X_h(i)[j-1,j]$ into cell C[j], the terminal of the user UG(i) waits until it is there before effecting a channel reservation request in that cell. The position information is supplied to the terminal by the control ground station SC in the form of a signaling message transmitted in a signaling channel of an uplink beam of the control station SC or of a repeater station receiving this message from the control station SC, towards the satellite from which the user UG(i) is visible and from the satellite to the terminal of the user UG(i) in a signaling channel of a downlink beam. Accordingly the terminal of the user UG(i) waits for the previously mentioned signaling message to effect the channel reservation request. In a variant of this, the control station SC makes the channel reservation request in cell C[j] on behalf of the terminal of the user UG(i).

Given the above, at the time user UG(i) is handed over into cell C[j], i.e. reaches handover point $X_h(i)[j-1,j]$, all users, ATG or no-ATG, communicating in cell C[j] at the time of the channel reservation request by the user UG(i) will have left cell C[j] and will no longer be allocated to cell C[j].

The channel reservation request from the user UG(i) is placed in the buffer memory W[j] associated with the cell C[j]. After each channel reservation request is written into memory W[j], a channel is reserved in cell C[j]. The channel that is reserved is either a free channel, that is to say a channel that is not occupied and not reserved, or a channel occupied by a terminal of any user but not already reserved. The channel that is reserved is preferably an occupied channel so as to leave channels free to satisfy any subsequent call set-up requests by other terminals in that cell.

The channel reservation requests contained in memory W[j] are organized in accordance with the distances between the corresponding users and their points of transfer into cell C[j]. Accordingly, to write the channel reservation request of user UG(i) in memory W[j], the distance D(i)[j] is compared to the distances between the users corresponding to channel reservation requests already included in memory W[j] and their respective points of transfer into cell C[j] at the time of the call set-up request from user UG(i). The reservation request from the user UG(i) is then written immediately after that of a user $UG^+(i)$ whose distance from his point of transfer into cell C[j] at the time of the call set-up request from the user UG(i) is less than the distance D(i)[j], and immediately before that of a user $UG^-(i)$ whose distance from his point of transfer into cell C[j] at the same time is greater than the distance D(i)[j]. The channel reservation requests of users UG$^+$(i), UG(i) and UG$^-$(i) are successively read in memory W[j] when these users reach their points of transfer into cell C[j]. A reserved channel is then allocated to them.

The memory W[j] contains only channel reservation requests in cell C[j] emitted by ATG user terminals entitled to the ATG service for the handover in cell C[j]. As already specified, each ATG user UG(i) is entitled to the ATG service only for a predetermined duration τ(i) corresponding to a predetermined distance L$_τ$(i) and therefore to a predetermined number J of cells on the path T(i). Beyond the predetermined distance L$_τ$(i), handovers of the user, or of his calls, from one cell to another are no longer guaranteed by the method of the invention. The terminal of the user must then emit a channel allocation request in each cell in the conventional way, like any ordinary non-ATG user terminal, whenever, for example, the power of the signal it receives in the cell to which it is allocated falls below a predetermined threshold.

The channel reservation requests from ATG users, included in memory W[j], take priority over any call set-up request. Accordingly, if any user terminal executes a call set-up request in cell C[j], for the request to be accepted, there must be a free channel, i.e. an unreserved channel that is not occupied in that cell, and a number of channels equal to the number of channel reservation requests in memory W[j] must have been reserved for the corresponding ATG users.

Figure 6B:
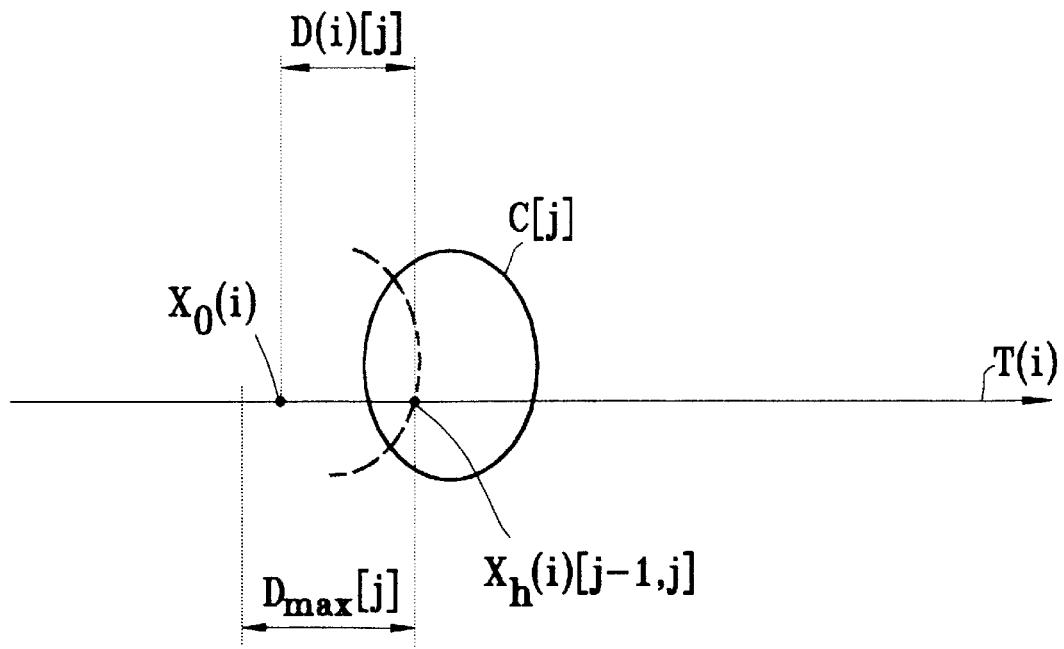

If, in step E3 of the FIG. 2A algorithm, distance D(i)[j] is less than D$_{max}$[j], as shown in FIG. 6B, step E5 verifies if there is one free call channel in cell C[j].

If there is at least one free channel in this cell, a reservation of this channel is immediately reserved by/for the terminal of the user UG(i) in step E6, and the algorithm then advances to step E16.

If no channel is free in cell C[j], and if C[j] is the first cell C[1], in which user UG(i) is located at time of their call set-up request, the algorithm stops at step E7. The call set-up request from user UG(i) is then refused.

If cell C[j] is a cell other than the first cell C[1] and if no channel is free in that cell, a sub-algorithm ALG shown in FIG. 2B is executed.

The sub-algorithm ALG primarily comprises steps E8 through E15. In step E8, the location of all ATG and non-ATG users communicating in cell C[j] is determined. Their location can be determined in the conventional way, in particular by regular emission by the terminal of each user of signaling messages to the cellular telecommunications system, or more precisely by calculating propagation times and Doppler effect, as described in the article by W. Zhao et al, entitled "A UT Positioning Approach for Dynamic Satellite Constellations" published in "Proceedings of the fourth International Mobile Satellite Conference 1995", Ottawa, Canada, Jun. 6–8, 1995, pages 35 through 41.

Figure 7A:
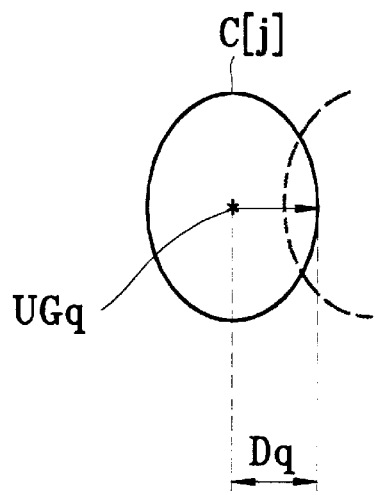
FIG. 7A is a diagram of a cell in which a maximal distance remains to be traveled by any user.

In the next step E9, the maximal distance remaining to travel in cell C[j] by each user communicating in that cell is calculated. As shown in FIG. 7A, for any user UGq of the cellular telecommunications system, the maximal remaining distance is defined by the distance Dq at the time of the call set-up request by user UG(i) between any user UGq and the contour of cell C[j] along the relative trajectory of user UGq in the frame of reference R$_s$ tied to the satellites, i.e. in a direction opposite to the movement of the satellites relative to the surface of the Earth. If any user UGq is an ATG user, the remaining distance Dq corresponds to the distance between his location at the time of said call set-up request and his point of transfer into the cell C[j+1] after cell C[j]. If any user UGq is a non-ATG user, the remaining distance Dq is the maximal distance that he is still likely to travel in cell C[j], given that his eventual transfer into a subsequent cell can take place before the limit of cell C[j].

Figure 7B:
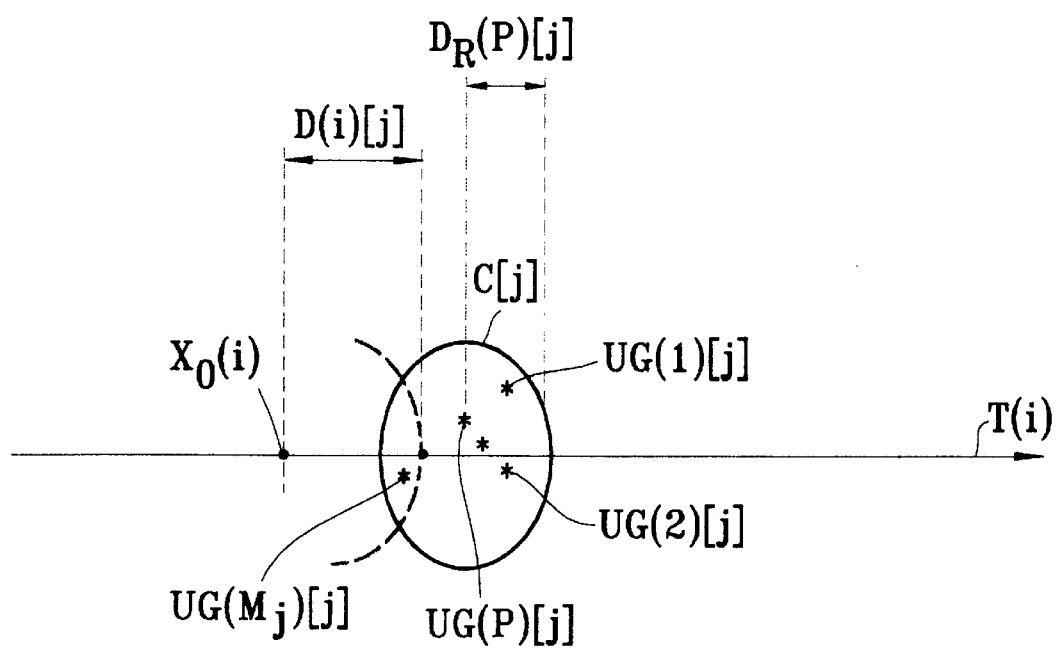
FIG. 7B is a diagram of a cell in which users are classified as a function of their maximal remaining distance to travel.

In step E10, users communicating in cell C[j] are sorted in a classified list in increasing order of their respective remaining distances. The classified users UG(1)[j] through UG(M$_j$)[j] in FIG. 7B, where M$_j$ is a integer equal to the total number of users communicating in cell C[j] at the time of the call set-up request by user UG(i), thus have respective remaining distances D$_R$(1)[j] through D$_R$(M$_j$)[j] such that D$_R$(1)[j]≦D$_R$(2)[j]≦ . . . ≦D$_R$(M$_j$)[j]. Also, each remaining distance D$_R$(m)[j], where m=1 through M$_j$, is compared to the distance D(i)[j] between user UG(i) and his point of transfer X$_h$(i)[j−1,j] into cell C[j]. The classified list of users is then truncated from a user UG(P+1)[j], where 1≦P≦M$_j$−1, for which the remaining distance D$_R$(P+1)[j] is greater than or equal to the distance D(i)[j], in other words only the first P users UG(1)[j] through UG(P)[j] having respective remaining distances less than the distance D(i)[j] remain on the list.

In step E11, if the integer P is equal to zero, that is to say if no remaining distance is less than the distance D(i)[j], the call set-up request from user UG(i) is refused in step E12 and all the channel reservations or channel reservation requests concerning user UG(i) effected for cells C[1] through C[j−1] preceding cell C[j] along the trajectory T(i) are cancelled. It is not certain that a channel will be freed in cell C[j] before user UG(i) reaches his point of transfer into that cell.

If in step E11 the integer P is at least equal to 1, an interactive process is used to verify for each user UG(P)[j], UG(P−1)[j], . . . , UG(1)[j] respectively in step E13 if the communication channel occupied by that user in cell C[j] is reserved. If the channels occupied by users UG(P)[j] through UG(1)[j] are already all reserved by ATG users the call set-up request from user UG(i) is refused in step E14 and all the reservations and reservation requests effected by/for user UG(i) in cells C[1] through C[j−1] preceding cell C[j] are cancelled.

On the other hand, if there is at least one communication channel occupied by one of users UG(P)[j] through UG(1)[j] which are not reserved, that channel is reserved in step E15. A channel reservation request by/for user terminal UG(i) is then written into the buffer memory W[j] associated with cell C[j] in the same manner as previously described. When the channel reservation request from user UG(i) is written in memory W[i] it is certain that a channel occupied at that time by any user in cell C[j] will be freed and can then be allocated to user UG(i) when he reaches his point of transfer X$_h$(i)[j−1,j].

Following step E15, the algorithm of the invention continues through steps E16 through E21 shown in FIG. 2A.

Steps E16 through E19 constitute an iterative test loop. In each area Z$_n$(i)[j] (n=0 through N) obtained by translating the cell C[j] as already indicated and including point X$_0$(i), step E17 compares the number N$_{ATG}$(i){Z$_n$(i)[j]} of ATG users already communicating and benefiting the ATG service for their transfer into cell C[j], to the capacity CC[j] in terms of communication channels of cell C[j].

If, in step E17, the aforementioned number of ATG users is equal to the capacity CC[j] of cell C[j], the algorithm stops at step E18, the call set-up request of user UG(i) is refused and all the reservations and channel reservations requests concerning user UG(i) effected for cells C[1] through C[j] are cancelled.

If the number $N_{ATG}(i)\{Z_n(i)[j]\}$ is less than the capacity CC[j] of cell C[j] and the integer n is less than N in step E19, the integer n is incremented at step E16 so as to apply step E17 to area $Z_{n+1}(i)[j]$ and then iteratively up to area $Z_n(i)[j]$ if the result of steps E17 is still positive.

If the algorithm does not stop in step E18, the cycle including steps E2 through E19 is resumed at step E20 for a subsequent cell C[j+1]. If the condition of step E17 is verified for the cell C[J], i.e. the last cell for which the user UG(i) is entitled to the ATG service, the call set-up request of the user UG(i) is accepted in step E21. At this time is certain that neither the call of user UG(i) nor the calls of other ATG users already accepted will be interrupted on handing over user UG(i) from one cell to the other during the predetermined duration $\tau(i)$, since in each cell to which the user UG(i) will be handed over, the total number of ATG users communicating in that cell will in no case exceed the capacity of that cell.

If the condition of step E3 is verified for the handover of the user UG(i) into a cell C[j], i.e. if $D(i)[j] \geq D_{max}[j]$, steps E4 and E16 are preferably executed if and only if, in a step E34, the number $N_{ATG}(i)\{Z_0(i)[i]\}$ of ATG users communicating in area $Z_0(i)[j]$ at the time of the call set-up request from the terminal of the user UG(i) entitled to the ATG service for their handover into cell C[j] is less than the capacity CC[j] of cell C[j]. If the number $N_{ATG}(i)\{Z_0(i)[j]\}$ is equal to CC[j], the algorithm stops at step E34', the call set-up request of user UG(i) is refused and all the channel reservation requests and channel reservations previously effected for user UG(i) are cancelled.

In a second embodiment of the invention, a preliminary step $E_{prel}$ reduces the area of the cell fixed to the satellites of the constellation, initially delimited by contours corresponding to a constant radio parameter, as already indicated.

Figure 8:
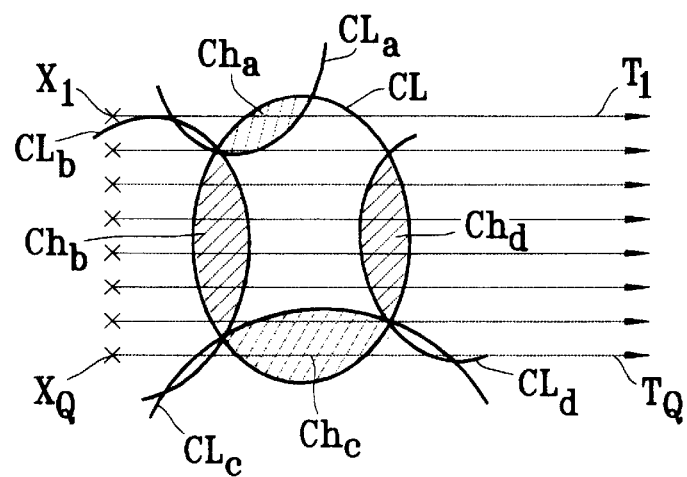
FIG. 8 is a diagram for reducing a cell in the second embodiment of the invention.

FIG. 8 shows how the area of any cell CL is reduced. For each user of a plurality of imaginary users moving along parallel paths $T_1$ through $T_Q$ in the frame of reference $R_S$ tied to the satellites, and crossing completely at least cell CL, the three criteria CR1, CR2 and CR3 defined previously are applied in order to allocate that user successively to cells in the same manner as already described with reference to FIG. 3A relating to step E1 of the algorithm. Paths $T_1$ through $T_Q$ are chosen so as to sweep the entire cell CL and so that their respective initial points $X_1$ through $X_Q$ are each outside an overlap area. In each area of overlap $Ch_a$ through $Ch_d$ between the cell CL and neighboring cells $CL_a$ through $CL_d$, if there is no imaginary user in this area along his path allocated to cell CL in accordance with the aforementioned three criteria, then the overlap area is eliminated in cell CL. In the example shown, the overlap areas $Ch_a$ and $Ch_b$ are eliminated since all the imaginary users crossing these areas are handed over into cell CL only after reaching the limit of cells $CL_a$ and $CL_b$, given the first criterion CR1. Areas $Ch_a$ and $Ch_b$ are exclusively allocated to cells $CL_a$ and $CL_b$, respectively. Likewise, area $Ch_d$ is allocated exclusively to cell CL. In contrast, area $Ch_c$ is maintained as an overlap area in cells CL and $CL_c$.

Figure 9:
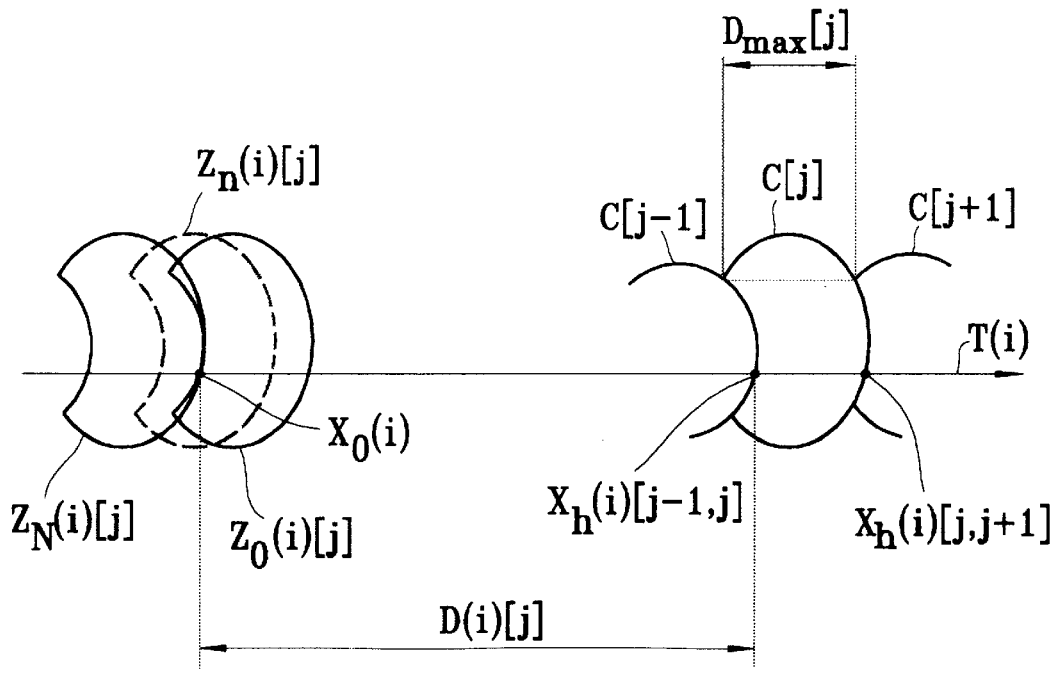
FIG. 9 is a diagram of areas obtained by translation of a reduced allocation cell in the second embodiment.

All steps E1 through E21, E34 and E34' of the algorithm of FIGS. 2A and 2B are executed in the same manner as in the first embodiment. In this second embodiment, cells C[1] through C[J] corresponding to the user UG(i) are cells the areas of which have previously been reduced, as shown in FIG. 9 in which, for simplicity, the same notation is used as in FIGS. 3B through 6B. The predetermined distance $D_{max}$[j] associated with the reduced area cell C[j] is determined beforehand in exactly the same way as previously described with reference to FIG. 5 for calculating the longest possible path of the user in that cell.

In step E1, however, if the user UG(i) is in an overlap area of several cells at the time of their call set-up request, for example overlap area $Ch_c$ shown in FIG. 8, the first cell to which they are allocated is not determined in accordance with the criterion CR2 previously mentioned, but is whichever cell of said plurality of cells that path T(i) reaches first. In this way it is certain that no ATG user possibly present in any of the areas eliminated from a cell will be allocated to the cell concerned.

In steps E17 and E34 of the FIG. 2A algorithm the numbers of ATG users $N_{ATG}(i)\{Z_n(i)[j]\}$ (n=0 through N) are determined in areas $Z_n(i)[j]$ of reduced sizes, which reduces the computation time and most importantly avoids the need to take into account in each area $Z_n(i)[j]$ ATG users who will not be allocated to the corresponding cell C[j] with the user UG(i). The probability of call set-up request refusal in steps E18 and E34' is thus reduced compared to the first embodiment of the invention.

Figure 10:
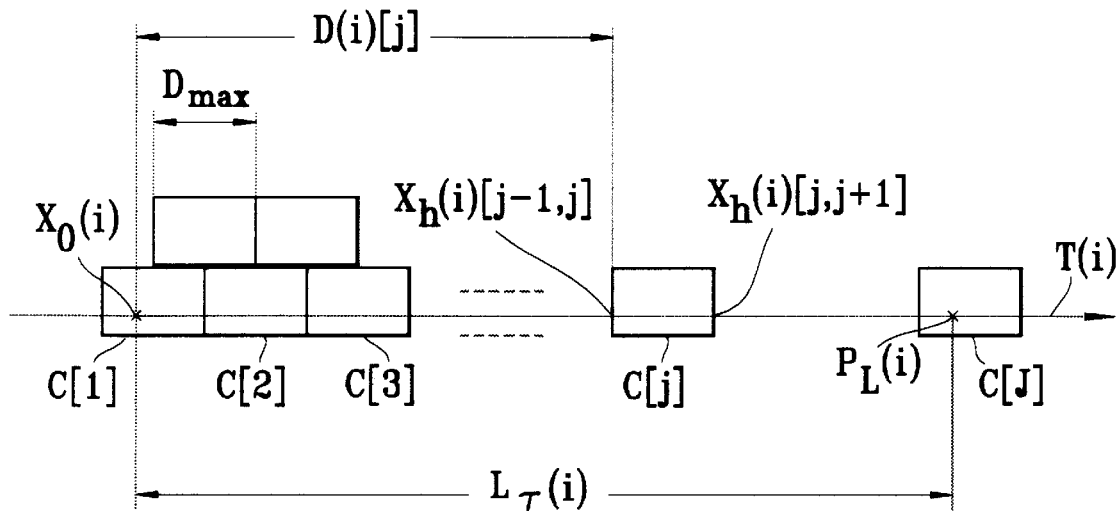
FIG. 10 shows identical rectangular cells used in a third embodiment of the invention.

In a third embodiment of the invention, the cells fixed to the satellites are all identical, with the same rectangular shape and the same capacity in terms of call channels CC. The rectangular cells are further contiguous and aligned with the direction of movement of the satellites relative to the surface of the Earth; in other words two sides of the cells are parallel to this direction of movement. FIG. 10 shows this particular case, in which user UG(i) travels the same distance in each of the rectangular cells along its path T(i), i.e. its time to cross each cell is the same. The predetermined maximum distance, here denoted $D_{max}$, is the same for all the rectangular cells and is equal to the length of the sides of the rectangle parallel to path T(i).

Figure 11:
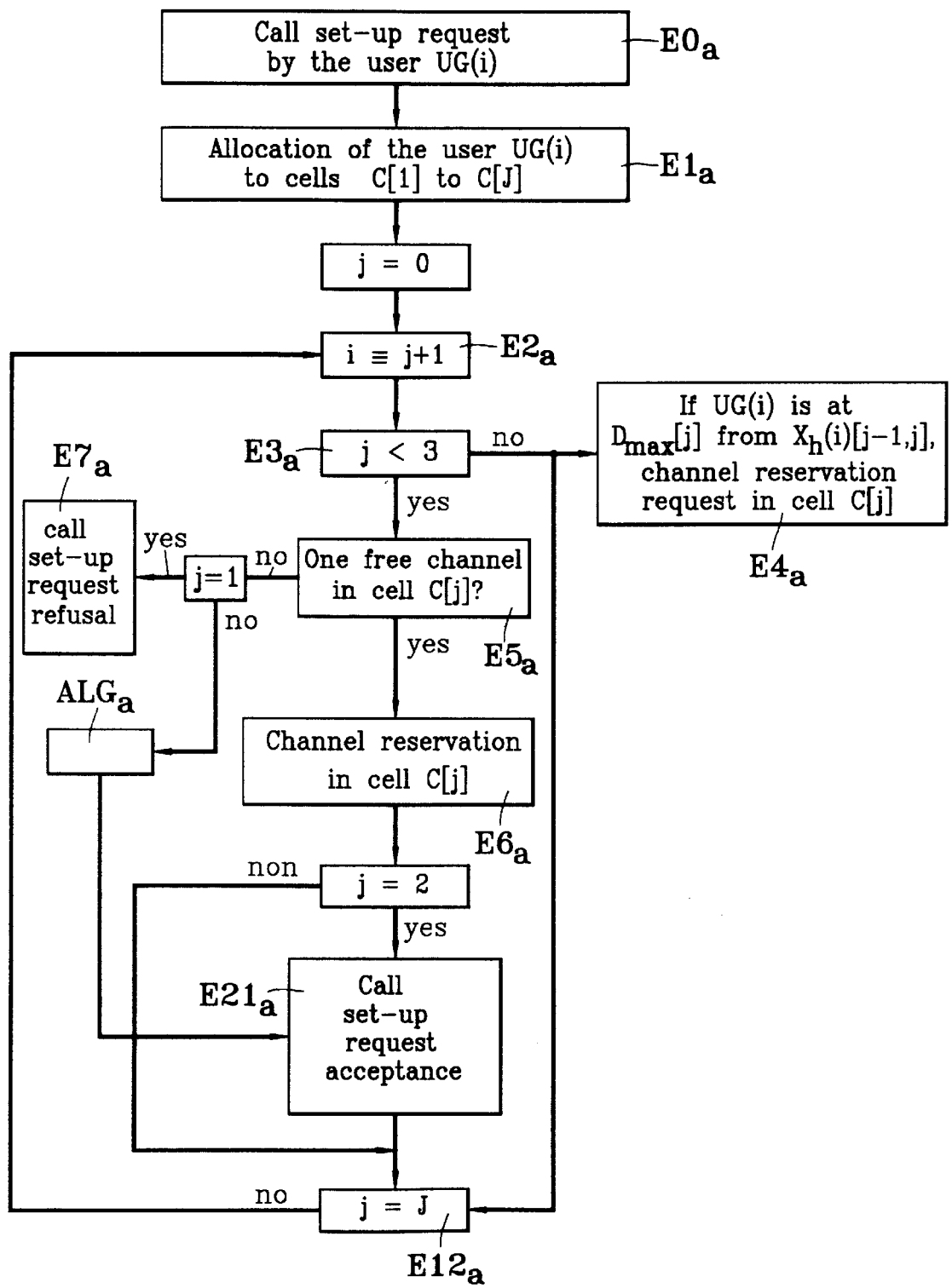
FIG. 11 is a call handover algorithm conforming to the third embodiment of the invention.

Referring to FIG. 11, in which, for simplicity, the same notation is used as in FIGS. 2 through 9, the algorithm in this third embodiment is simplified compared to the algorithm of the first embodiment shown in FIG. 2A.

In step $E1_a$ for allocation of the user UG(i) to cells, cells C[1] through C[J] to which the user is allocated are the first J rectangular cells crossed, even partially, by path T(i), the integer J depending on the duration $\tau(i)$ previously defined by the user UG(i) as previously described. The three criteria CR1 through CR3 used in the first embodiment are not applied in this third embodiment. The test step E34 associated with the call set-up request refusal step E34' and the steps E16 through E19 are eliminated in the third embodiment.

Step $E5_a$ verifies if there is at least one free call channel in each of the first two rectangular cells C[1] and C[2] crossed by path T(i) of the user UG(i) (steps $E2_a$ and $E3_a$), cell C[1] including initial point $X_0(i)$.

If there is a free channel in step $E5_a$ that channel is reserved by/for user terminal UG(i) in step $E6_a$. If the condition of step $E5_a$ is verified for both cells C[1] and C[2] the call set-up request is accepted in step $E21_a$.

If no channel is available in the first cell C[1] the call set-up request is refused in step $E7_a$, as in step E7.

If there is a free channel in the first cell C[1] but not in the second cell C[2] a sub-algorithm $ALG_a$ identical to the sub-algorithm ALG from FIG. 2B is executed for cell C[2]. If in a step of the sub-algorithm $ALG_a$ identical to step E13 in FIG. 2B there exists a channel in cell C[2] occupied by any user that will leave that cell before user UG(i) is allocated to it and that is not reserved that channel is then reserved as in step E15 and the call set-up request is accepted.

For each subsequent cell C[j], with $3 \leq j \leq N$, the user UG(i) waits until they are at the distance $D_{max}$ from cell C[j], i.e. from entry point $X_n(i)[j-1,j]$ into cell C[j], to effect a channel reservation request in step E4$_a$. Accordingly, on each handover of user UG(i) into cell C[j], a channel reservation request is emitted in the next cell C[j+1].

The above description has been given for cells fixed to satellites in the same orbit. The present invention also applies if user UG(i) crosses cells fixed to satellites in different, parallel or concurrent orbits, for example orbits intersecting the equator when projected onto the terrestrial surface.

Figure 12:
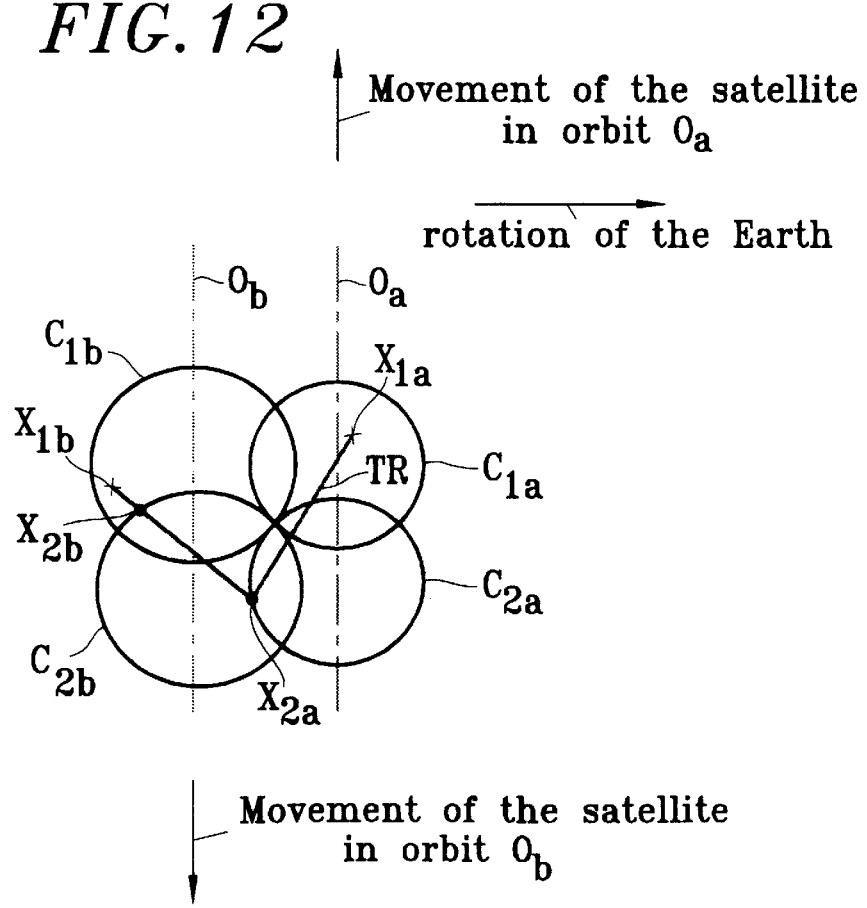
FIG. 12 shows cells fixed to satellites moving in different directions.

FIG. 12 shows, by way of example, two cells $C_{1a}$ and $C_{2a}$ fixed to one or two satellites in an orbit $O_a$, and two cells $C_{1b}$, $C_{2b}$ fixed to one or two satellites moving in the opposite direction to the cells $C_{1a}$ and $C_{2a}$ in an orbit $O_b$ adjacent orbit $O_a$. An imaginary path TR is defined for any user UG initially at a point $X_{1a}$ in cell $C_{1a}$ at the time of a call set-up request effected by the latter's terminal. Path TR, determined in accordance with the three criteria CR1 through CR3, includes a first rectilinear portion $X_{1a}X_{2a}$ in a direction opposite the direction of movement of the satellites in the orbit $O_a$ relative to the surface of the Earth, the end point $X_{2a}$ of which is on the contour of cell $C_{2a}$. A second rectilinear portion $X_{2a}X_{1b}$ of path TR is in a direction opposite the direction of movement of the satellites in orbit $O_b$ relative to the surface of the Earth.

FIGS. 2A and 2B algorithm is applied to the user UG as described hereinabove. All distances are measured along his broken path TR and cell translations are effected also along path TR. Accordingly, the length of path TR, equal to the sum of the lengths of the portions $X_{1a}X_{2a}$ and $X_{2a}X_{1b}$, is the maximal predetermined length defined in advance by the user UG. For example, the distance between the user UG at the time of his call set-up request and his handover point into cell $C_{1b}$, denoted $X_{2b}$, is equal to the sum of the lengths of the portions $X_{1a}X_{2a}$ and $X_{2a}X_{2b}$.

What we claim is:

1. A method of handing over calls of predetermined users in a cellular telecommunications system using a constellation of non-geostationary satellites and satellite-fixed cells, said cells with which call channels are respectively associated, having predetermined respective contours and moving relative to the surface of the Earth in a predetermined direction, the speed of predetermined users relative to the surface of the Earth being negligible in comparison to the speed of travel of the cells, the predetermined users having locations known at the time of each call set-up request emitted by predetermined user's terminals, said method including, for a given user among said predetermined users, after a call set-up request emitted by the terminal of said given user and for each cell of a predetermined group of adjacent cells to which said given user may be successively allocated, said given user being in a first cell of the predetermined group at the time of the call set-up request:

first steps wherein, if a first distance between said given user and a predetermined handover point into said each cell at the time of said call set-up request is greater than a predetermined distance equal to a maximal length of said each cell parallel to said predetermined direction, a reservation of a call channel associated with said each cell is requested for the terminal if said given user's terminal is substantially at said predetermined distance from said predetermined handover point, said first distance being zero if said each cell is said first cell of said predetermined group, second steps in which, if said first distance is less than said predetermined distance, (a) if there is a free communication channel associated with said each cell, said free communication channel is reserved for said given user's terminal, (b) if said each cell is not said first cell and if no channel associated with said each cell is free but if among the latter there is an unreserved channel occupied by the terminal of any user of said telecommunications system situated at a distance from the contour of said each cell in a direction opposite to said predetermined direction less than said first distance, then said occupied unreserved channel is reserved for said given user's terminal, (c) otherwise, said call set-up request is refused, and third steps in which said call set-up request is refused if a number of predetermined users communicating and included in an area obtained by translation of said each cell in said predetermined direction by a distance between said first distance and a second distance is at least equal to a communication channel capacity of said each cell, said second distance at the time of the call set-up request extending between said given user and a predetermined transfer point of said given user into an allocation cell succeeding said each cell.

2. A method as claimed in claim 1, wherein if, at the time of said call set-up request, said first distance is greater than said predetermined distance, said reservation of a call channel is requested only if a number of communicating users which are included in an area obtained by translating said each cell in said predetermined direction by said first distance and of which the respective predetermined groups of adjacent cells include said each cell, is less than the capacity in terms of call channels of said each cell.

3. A method as claimed in claim 1, wherein said predetermined group of adjacent cells is constructed so that said given user is not handed over into said each cell, if said each cell is a cell other than said first cell of said predetermined group, until after having remained allocated for as long as possible to a preceding cell.

4. A method as claimed in claim 1, wherein said predetermined group of adjacent cells is constructed so that if, on leaving a cell of said predetermined group, said given user is simultaneously included in plural cells of said telecommunications system, the cell from said plural cells to which said given user is allocated is that in which the travel time of said given user is the longest.

5. A method as claimed in claim 1, including a step for eliminating beforehand in each of the cells of said telecommunications system at least one area of overlap with another cell of said telecommunications system.

6. A method as claimed in claim 1, wherein said cells of said telecommunication system are identical, rectangular in shape, contiguous and aligned relative to said predetermined direction and wherein said third steps are eliminated.

7. A method as claimed in claim 1, wherein said number of predetermined users communicating concerns only predetermined users whose predetermined groups of adjacent cells include said each cell.

8. A method as claimed in claim 1, wherein the number of cells included in said predetermined group of adjacent cells depends on a predetermined duration during which said method is applied for said given user for each call set-up request transmitted by said given user's terminal.

* * * * *

UNITED STATES PATENT AND TRADEMARK OFFICE
CERTIFICATE OF CORRECTION

PATENT NO. : 6,122,507
DATED : September 19, 2001
INVENTOR(S) : Gerard MARAL It is certified that error appears in the above-indentified patent and that said Letters Patent is hereby corrected as shown below:

On the title page, item:
    [75] Inventors: Gerard MARAL; Joaquin RESTREPO

Signed and Sealed this

Eighth Day of May, 2001

*Attest:*

NICHOLAS P. GODICI

*Attesting Officer*     *Acting Director of the United States Patent and Trademark Office*

UNITED STATES PATENT AND TRADEMARK OFFICE
CERTIFICATE OF CORRECTION

PATENT NO.    : 6,122,507                               Page 1 of 1
DATED         : September 19, 2000
INVENTOR(S)   : Gerard Maral It is certified that error appears in the above-identified patent and that said Letters Patent is hereby corrected as shown below:

<u>Title page,</u>
Should read:
-- Item [75]  Inventors:  Gerard Maral; Joaquin Restrepo --

This Certificate of Correction Supercedes Certificate issued May 8, 2001

Signed and Sealed this

Eleventh Day of May, 2004

JON W. DUDAS
*Acting Director of the United States Patent and Trademark Office*